US006898364B2

(12) United States Patent
McLean et al.

(10) Patent No.: US 6,898,364 B2
(45) Date of Patent: May 24, 2005

(54) BUFFER LAYER PROMOTION OF DECREASE OF ONE OR MORE STRAIN GRADIENTS IN OPTICAL FIBER WINDING

(75) Inventors: Thomas McLean, Woodland Hills, CA (US); John Phillip Rahn, West Hills, CA (US); Manfred Schiruska, Woodland Hills, CA (US)

(73) Assignee: Northrop Grumman Corporation, Woodland Hills, CA (US)

( * ) Notice: Subject to any disclaimer, the term of this patent is extended or adjusted under 35 U.S.C. 154(b) by 312 days.

(21) Appl. No.: 10/228,974

(22) Filed: Aug. 27, 2002

(65) Prior Publication Data

US 2004/0041085 A1 Mar. 4, 2004

(51) Int. Cl.[7] ................................................ G02B 6/00
(52) U.S. Cl. ...................... 385/137; 385/12; 385/27; 385/31; 385/128; 385/136; 385/123
(58) Field of Search .............................. 385/12, 15, 27, 385/31, 123, 126, 127, 128, 136, 137

(56) References Cited

U.S. PATENT DOCUMENTS

| | | | | |
|---|---|---|---|---|
| 5,155,707 A | * | 10/1992 | Fisher | 367/149 |
| 5,213,212 A | * | 5/1993 | Holzschuh | 206/397 |
| 5,767,509 A | | 6/1998 | Cordova et al. | 250/227.11 X |
| 5,822,065 A | | 10/1998 | Mark et al. | 356/350 |
| 5,896,199 A | * | 4/1999 | Mark et al. | 356/465 |
| 6,546,180 B1 | * | 4/2003 | Koyano et al. | 385/135 |
| 6,650,821 B1 | * | 11/2003 | Koyano et al. | 385/136 |
| 6,707,975 B2 | * | 3/2004 | Bueschelberger et al. | 385/123 |
| 2005/0008279 A1 | * | 1/2005 | Carlson et al. | 385/13 |

OTHER PUBLICATIONS

"Strain"; http://www.dictionary.com/search?q=strain; Lexico, LLC; Lexico, LLC, 13428 Maxella Avenue #236, Marina del Rey, CA 90292; 6 pgs.; Jun. 27, 2002.

"Flange"; http://www.dictionary.com/search?q=strain; Lexico, LLC; Lexico, LLC, 13428 Maxella Avenue #236, Marina del Rey, CA 90292; 1 pg.; May 6, 2002.

"Potting Compound Selection"; http://www.pottingsolutions.com/my%20site/Technology/Resin%20 Selection.htm; Potting Solutions Potting Compound Selection Technology; 2 pgs.; Jun. 27, 2002.

"Thermal Expansion Coefficient"; http://scienceworld.wolfram.com/physics/ThermalExpansionCoeffecient.html; Eric Weinstein's World of Physics; 2 pgs.; Jun. 27, 2002.

"Stress"; http://www.dictionary.com/search?q=stress; Lexico, LLC; Lexico, LLC, 13428 Maxella Avenue #236, Marina del Rey, CA 90292; 6 pgs.; May 24, 2002.

"Young's Modulus"; http://www.glossary.oilfield.slb.com/Display.cfm?Term=Young's%modulus; Schlumberger Oilfield Glossary; 1 pg.; May 6, 2002.

"Poisson's Ratio"; http://www.glossary.oilfield.slb.com/Display.cfm?Term=Poisson%27s%20ratio; Schlumberger Oilfield Glossary; 1 pg.; Jun. 27, 2002.

"Youngs Modulus from Uniaxial Tension"; http://www.e-funda.com/formulae/solid_mechanics/elastic_constants_E_nu.cfm; Efunda Engineering Fundamentals; 2 pgs.; Jun. 26, 2002.

(Continued)

*Primary Examiner*—Brian M. Healy
(74) *Attorney, Agent, or Firm*—Patti & Brill, LLC

(57) ABSTRACT

An apparatus in one example comprises a buffer layer located on a face that serves as a primary support for an optical fiber winding along a first general direction. The face is coupled with a body that serves as a primary support for the optical fiber winding along a second general direction. The optical fiber winding comprises an optical fiber wound about the body. The buffer layer serves to promote a decrease of one or more strain gradients among a plurality of portions of the optical fiber winding.

31 Claims, 4 Drawing Sheets

OTHER PUBLICATIONS

"Fiber Optic Sensors and Their Applications"; http://www.ntu.edu.sg/mpe/research/programmes/sensors/fos/foss; A. Selvarajan, Chairman, Dept. of Electrical Communication Engineering, Indian Institute of Science, Bangalore–560 012; 24 pgs; Jun. 17, 2002.

Poisson's Ratio; http://www.webelements.com/webelements/properties/text/definitions/poissons–ratio.html; WebElements Bulletin Board; 1 pgs.; Jun. 26, 2002.

"Shear"; www.seaonc.org;SEAONC Tips for the Media; 1 pg.

"Finite element";http://www.ces.clemson.edu/~Ionny/courses/em852/glossary.html; Finite Element Analysis Glossary; 1 pg.; Jun. 5, 2002.

"Quantitative Analysis of the Shupe Reduction in Fiber–Optic Sagnac Interferometer"; http://www.spie.org/app/publications/journals/pdfs/OEL_02005_Online.pdf; Information Storage Ctr., Shanghai Jiaotong Univ., Huashang Rd 1954#, Shanghai, 200030, China; 11 pgs.; Mar. 12, 2002.

* cited by examiner

BUFFER LAYER PROMOTION OF DECREASE OF ONE OR MORE STRAIN GRADIENTS IN OPTICAL FIBER WINDING

TECHNICAL FIELD

The invention relates generally to optical fiber windings and more particularly to decreasing of strain gradients in an optical fiber winding.

BACKGROUND

A length of optical fiber is wound about a hub of a spool in the form of an optical fiber coil. The optical fiber coil abuts against a flange of the spool. The optical fiber and the flange in one example are made from different materials. A temperature change causes the materials to expand. Because the different materials have different expansion coefficients, the optical fiber coil and the flange expand to different degrees. Since the optical fiber coil and the flange are in contact, the differential expansion must be absorbed by either or both of the optical fiber coil and the flange.

Where the flange is more rigid than the optical fiber coil, the flange serves to constrain expansion of a segment of the optical fiber coil located adjacent to the flange. That segment of the optical fiber coil constrained by the flange therefore expands differently than other segments of the optical fiber coil located further from the flange.

As one shortcoming, these differences in expansion between the segments of the optical fiber coil create sharp gradients in the strain of the optical fiber coil. As another shortcoming, the segment of the optical fiber coil located adjacent to the flange is deformed. As a further shortcoming, the deformation causes asymmetry in the optical fiber coil that results in movement, due to environmental causes such as temperature changes or stress due to vibration, in the optical midpoint as perceived by light passing through the optical fiber coil. This movement is represented by relatively large peak-to-peak thermal Shupe bias variations. Disadvantageously, such strain gradients negatively affect signal propagation by the optical fiber coil.

One design employs a buffer layer located only on the hub. The design lacks any additional buffer layer on any other part of the spool. As one shortcoming, the buffer layer located only on the hub has relatively little, if any, effect toward decreasing the strain gradients between the segment of the optical fiber coil located at the flange and the other segments of the optical fiber coil located further from the flange.

Thus, a need exists for enhanced promotion of a decrease of strain gradients in an optical fiber winding. A need also exists for promotion of a decrease of strain gradients between segments of an optical fiber winding located at different distances from a face coupled with a body, such as a flange of a spool. A further need exists for enhanced promotion of a decrease of deformation of an optical fiber winding.

SUMMARY

The invention in one embodiment encompasses an apparatus. The apparatus includes a buffer layer located on a face that serves as a primary support for an optical fiber winding along a first general direction. The face is coupled with a body that serves as a primary support for the optical fiber winding along a second general direction. The optical fiber winding comprises an optical fiber wound about the body. The buffer layer serves to promote a decrease of one or more strain gradients among a plurality of portions of the optical fiber winding.

Another embodiment of the invention encompasses a method. A decrease of one or more strain gradients in an optical fiber winding is promoted through employment of a buffer layer on a face that serves as a primary support for the optical fiber winding along a first general direction. The face is coupled with a body that serves as a primary support for the optical fiber winding along a second general direction. The optical fiber winding comprises an optical fiber wound about the body.

DESCRIPTION OF THE DRAWINGS

Features of exemplary implementations of the invention will become apparent from the description, the claims, and the accompanying drawings in which:

DETAILED DESCRIPTION

Figure 1:
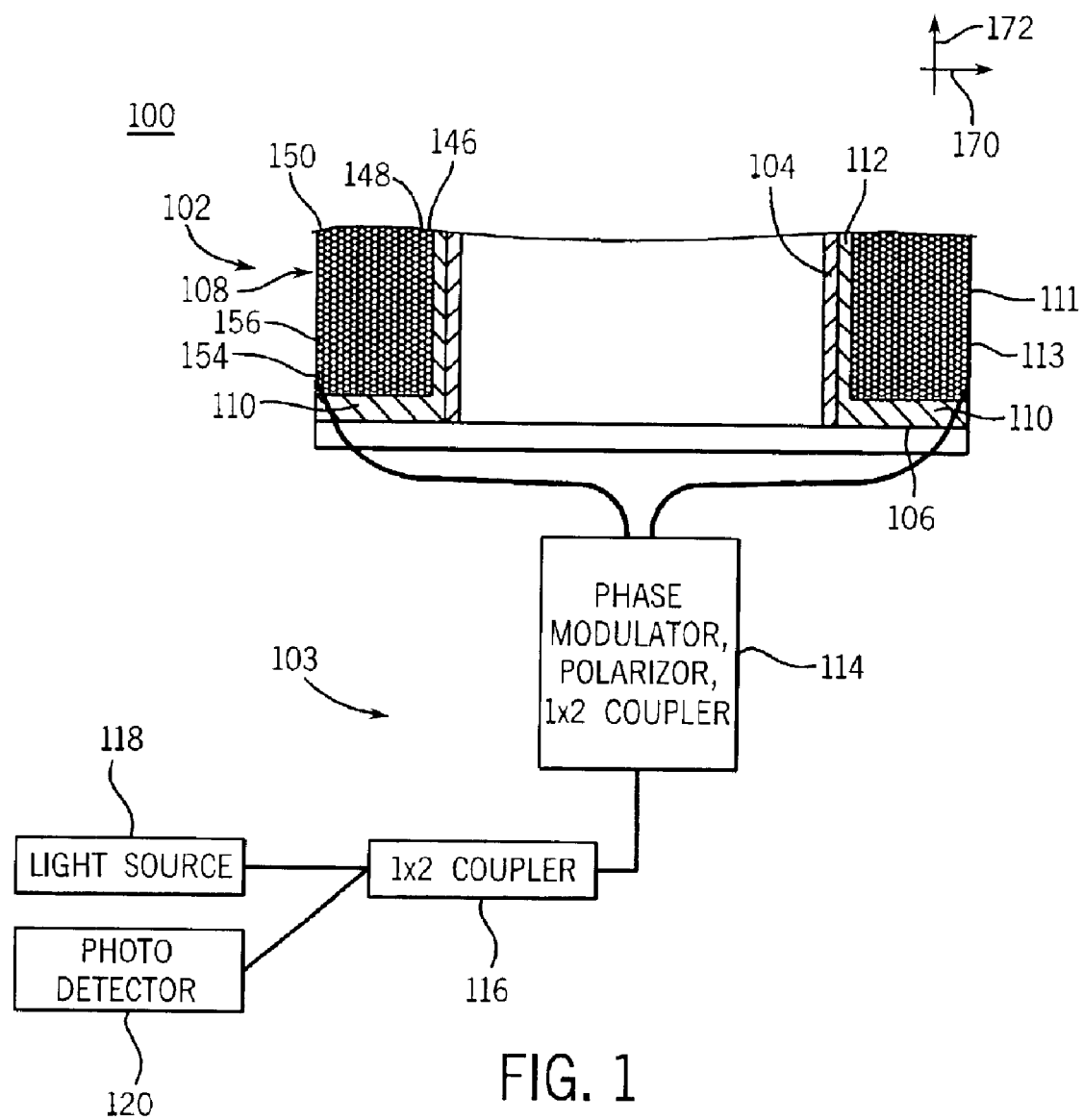
FIG. 1 is a partial, cutaway, side, sectional and block representation of one exemplary implementation of an apparatus that comprises a sensing component and a processing component, illustrating the sensing component with a body coupled with a face, buffer layers thereon, and an optical fiber winding supported thereby.

Turning to FIG. 1, an apparatus 100 in one example comprises a buffer layer located on a face that serves as a primary support for an optical fiber winding along a first general direction. The face is coupled with a body that serves as a primary support for the optical fiber winding along a second general direction. The optical fiber winding comprises an optical fiber wound about the body. The buffer layer serves to promote a decrease of one or more strain gradients among a plurality of portions of the optical fiber winding. The apparatus 100 includes a plurality of components. A number of such components can be combined or divided in the apparatus 100.

In one example, the apparatus 100 comprises a fiber optic gyroscope. The apparatus 100 comprises a sensing component 102 and a processing component 103. The sensing component 102 comprises one or more bodies 104, one or more faces 106, one or more optical fiber windings 108, one or more buffer layers 110, and zero or more buffer layers 112. The body 104 is coupled with the face 106. The body 104 in one example comprises a hub of a spool. The hub comprises a solid or hollow cylindrical member. The face 106 in one example comprises an inward face of a flange of the spool. The flange comprises a rim at an end of the hub.

The diameter of the flange is larger than the diameter of the hub. The hub and the flange in one example comprise a rigid material such as steel. In a further example, the hub and the flange comprise a unitary construction and/or integral formation.

The body 104 serves as a primary support for the optical fiber winding 108 along a general direction 170. The general direction 170 is directed substantially along a radius of the body 104. The body 104 serves as the primary support for the optical fiber winding 108 along the general direction 170, for example, whether the optical fiber winding 108 is directly atop the body 104 or the optical fiber winding 108 is about other material or structure located between the optical fiber winding 108 and the body 104.

The optical fiber winding 108 in one example comprises sensing coil. The sensing coil in one example comprises a quadrapole-winding pattern. In another example, the sensing coil comprises a dipole-winding pattern, as will be understood skilled in the art. In one example, the optical fiber winding 108 comprises an optical fiber 111 wound about the body 104. In a further example, the optical fiber winding 108 comprises interstitial material 113. The interstitial material 113 in one example serves to bond together the turns of the optical fiber wiziding 108, as described herein.

The optical fiber 111 is wound about the body 104, for example, in one or more layers. Each layer in one example is located at a respective approximate distance outward from the body 104. Exemplary layers of the optical fiber winding 108 about the body 104 comprise layers 146, 148, and 150. The layer 146 in one example is located adjacent to the body 104. For example, the layer 146 is wound directly on the body 104. In another example, the layer 146 is wound onto the buffer layer 112 atop the body 104. The layer 148 is wound onto the layer 146. The layer 148 is one layer outward from the layer 146 relative to the body 104. Subsequent layers are wound about the layers 146 and 148 until reaching the layer 150. The layer 150 comprises an outermost layer relative to the body 104.

In addition, the optical fiber winding 108 comprises a plurality of portions. Exemplary portions comprise portions 154 and 156 of the optical fiber winding 108. The portion 154 is located relatively closer to the face 106 than is the portion 156. The portions 154 and 156 in one example are located in the layer 150. The buffer layer 110 serves to decrease one or more strain gradients among at least some of the plurality of portions of the optical fiber winding 108, as described herein.

Figure 2:
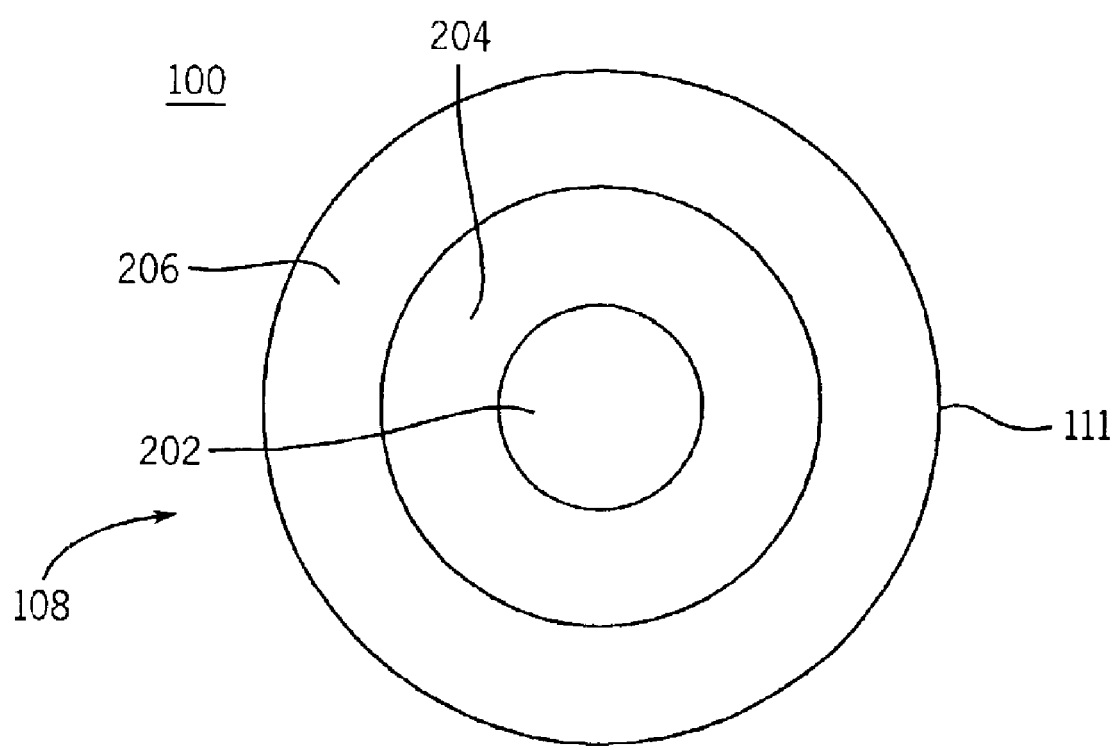
FIG. 2 is an enlarged, sectional, axial representation of an optical fiber of the optical fiber winding of the apparatus of FIG. 1.

Referring to FIGS. 1–2, the optical fiber 111 of the optical fiber winding 108 comprises a transparent member 202, an inner jacket 204, and an outer jacket 206. The transparent member 202 in one example comprises glass fiber. In another example, the transparent member 202 comprises plastic. For example, the transparent member 202 comprises a diameter of approximately eighty microns. The transparent member 202 comprises a core and a cladding. The core of the transparent member 202 comprises an optical path or waveguide for propagation of light. The light has a high intensity in the core and a low intensity outside the core. In one example, the core of the transparent member 202 comprises a diameter of six to seven microns. The core of the transparent member 202 in one example is doped with germanium. The cladding of the transparent member 202 and the doping of the core serves to keep light in the core of the transparent member 202.

The inner jacket 204 serves to cushion the glass fiber 202 from external forces and thereby avoid polarization crossovers which otherwise could cause problems for the optical fiber winding 108, as will be understood by those skilled in the art. For example, the inner jacket 204 comprises a first polymer layer. The inner jacket 204 in one example comprises the largest expansion coefficient in the sensing component 102. During thermal changes, the inner jacket 204 contributes most to volume changes in the optical fiber winding 108 and the remainder of the sensing component 102 because of the relatively high expansion coefficient of the inner jacket 204. During thermal increases, the inner jacket 204 contributes most to expansion in the optical fiber winding 108 and the remainder of the sensing component 102. During thermal decreases, the inner jacket 204 contributes most to contraction in the optical fiber winding 108 and the remainder of the sensing component 102.

The outer jacket 206 comprises a coating on the inner jacket 206. The outer jacket 206 serves to provide mechanical strength for the optical fiber 111 against abrasion such as from handling of the optical fiber 111. For example, the outer jacket 206 comprises a second polymer layer.

In a further example, the interstitial material 113 is located on the outer jacket 206. The interstitial material 113 in one example comprises a potting compound or polymer that is coated on the outer jacket 206 during winding of the optical fiber 111 about the body 104. For example, the interstitial material 113 is located between the centers of adjacent portions of the optical fiber winding 108. The interstitial material 113 serves to bond and/or tie together the turns of the optical fiber winding 108. In one example, the interstitial material 113 serves to prevent relative movement of the portion of the optical fiber winding 108 and thereby promote a decrease of a vibrational Shupe effect. For example, the interstitial material 113 serves to hold the optical fiber 108 as a wound unit about the body 104.

The face 106 serves as a primary support for the optical fiber winding 108 along a general direction 172. The general direction 172 is substantially in parallel with an axis of the body 104. The directions 170 and 172 comprise substantially orthogonal directions. The face 106 serves as the primary support for the optical fiber winding 108 whether the optical fiber winding 108 directly abuts the face 106 or the optical fiber winding 108 abuts other material or structure located between the optical fiber winding 108 and the face 106.

The buffer layer 110 is located on the face 106. For example, the buffer layer 110 is located between the face 106 and the optical fiber winding 108. The buffer layer 110 comprises one or more compressible and/or resilient layers. For example, the buffer layer 110 comprises a potting compound or polymer. The buffer layer 110 in one example comprises a coating on the face 106. The buffer layer 110 serves to promote a decrease of strain gradients in the optical fiber winding 108, as described herein.

The buffer layer 110 and the interstitial material located on the optical fiber 111 in one example comprise a substantially same material, for example, a potting compound or polymer. The buffer layer 110 in one example is applied to the face 106 before the optical fiber 111 is wound about the body 106. For example, the buffer layer 110 is applied to the face 106 in a liquid or paste form. Next, the buffer layer 110 is preserved and/or finished, for example, by curing. In another example, the buffer layer 110 is pre-formed and then applied to the face 106. In yet another example, the face 106 and the buffer layer 110 comprise a unitary construction and/or integral formation.

The thickness of the buffer layer 110 in one example is in the range of one hundred to six hundred micrometers. For example, the thickness of the buffer layer 110 varies with the implementation of the apparatus 100. In a further example, first and second implementations of the apparatus 100 have different thicknesses for the buffer layer 110 that are scaled according to the different sizes of the optical fiber windings 108. Different implementations of the apparatus 100 have different requirements and/or tolerances, such as vibration sensitivity. Vibrations increase with the thickness of the buffer layer 110. Vibrations greater than a specific limit for a particular implementation of the apparatus 100 serve to compromise performance. So, employment of a relatively thin instance of the buffer layer 110 serves to accommodate a relatively high sensitivity to vibrations of the particular implementation of the apparatus 100. Thicker instances of the buffer layer 110 serve to increase vibration amplitude of the optical fiber winding 108 by decreasing the resonance frequency of the optical fiber winding 108. In one example, it is desirable to avoid increasing the vibration amplitude of the optical fiber winding 108.

The Poisson's ratio of the buffer layer 110 in one example is in the range of 0.4970 to 0.4980. The Young's modulus of the buffer layer 110 in one example is approximately equal to $7 \times 10^6$ Newtons per square meter.

The buffer layer 112 is located on the body 104. For example, the buffer layer 112 is located between the body 104 and the optical fiber winding 108. In a further example, the buffer layer 112 comprises a coating on the body 104. One previous design employed a buffer layer only on a hub of a spool, without employment of a buffer layer on any flange of the spool. That previous design suffered from lack of any buffer layer analogous to the buffer layer 110 of the apparatus 100, as described herein. In one example, the buffer layer 112 serves to cooperate with the buffer layer 110 to promote a decrease of strain gradients in the optical fiber winding 108. For example, the buffer layers 110 and 112 serve to promote a decrease of strain gradients in zero or more overlapping and one or more non-overlapping portions of the optical fiber winding 108.

The buffer layers 110 and 112 in one example comprise a substantially same material. For example, the buffer layers 110 and 112 comprise a potting compound or polymer. The buffer layers 110 and 112 in one example comprise a unitary construction and/or integral formation. For example, the buffer layers 110 and 112 comprise a continuous buffer layer applied to the face 106 and the body 104. In a further example, the buffer layers 110 and 112 are applied separately under conditions that allow the buffer layers 110 and 112 to combine or unite at a junction thereof. One or more of timing, pressure, and temperature conditions in one example serve to unite the buffer layers 110 and 112. In another example, the buffer layers 110 and 112 comprise separate constructions and/or non-integral formations. For example, the buffer layer 110 is applied to the face 106 and the buffer layer 112 is separately applied to the body 104. In a further example, the buffer layers 110 and 112 abut without integrated material combination therebetween.

Where the apparatus 100 comprises a fiber optic gyroscope, the processing component 103 in one example comprises one or more signal processing and/or relay components 114 and 116, a light source 118, and a light destination 120. The light source 118 serves to transmit light to the signal processing and/or relay components 114 and 116. In one example, the signal processing and/or relay components 114 and 116 in one example comprise one or more phase modulators, one or more polarizors, and one or more 1×2 couplers. The signal processing and/or relay components 114 and 116 serve to propagate the light from the light source 118 to the optical fiber winding 108. The optical fiber winding 108 serves to modify the light based on a rate of rotation experienced by the optical fiber winding 108, where the apparatus 100 comprises the fiber optic gyroscope. The optical fiber winding 108 provides a return path for the light to the signal processing and/or relay components 114 and 116. Next, the signal processing and/or relay components 114 and 116 propagate the light from the optical fiber winding 108 to the light destination 120. In one example, the light destination 120 comprises a photodetector. The light destination 120 serves to analyze the light for modifications imparted thereto by travel through the optical fiber winding 108.

An illustrative description of exemplary operation of the apparatus 100 is now presented, for explanatory purposes.

As temperature increases, the optical fiber 111 expands to a degree represented by a first coefficient and the face 106 expands to a degree represented by a second coefficient, different from the first coefficient. The coefficients of expansion of the optical fiber 111 and the face 106 are different because the materials of the optical fiber 111 and the face 106 are different. The different coefficients of expansion of the optical fiber 111 and the face 106 promote a difference in respective amounts of expansion thereof. The buffer layer 110 serves to accommodate the difference in the amounts of expansion promoted in the optical fiber 111 and the face 106 by the temperature increase. For example, the buffer layer 110 serves to absorb some of the difference in the amounts of expansion promoted in the optical fiber 111 and the face 106.

The buffer layer 110 serves to promote a decrease of a difference between an amount strain arising in the fiber portion 154 and an amount of strain arising in the fiber portion 156. In one example, the buffer layer 110 serves to promote uniformity of strain along the optical fiber winding 108. Since the face 106 is more rigid than the optical fiber winding 108, the portions of the optical fiber winding 108 located closer to the face 106 are more constrained during thermal expansion than the portions of the optical fiber winding 108 located further from the face 106. The buffer layer 110, because of its low elastic shear modulus, absorbs at least some of a contact (e.g., shear stress) between the face and a portion of the optical fiber winding 108 located adjacent to the face. This elastic shear of the buffer layer 110 serves to allow the portion 154 of the optical fiber winding 108 to expand more than would be possible were the buffer 110 not present.

So, the portion 154 of the optical fiber winding 108 expands to a degree more similar to the portion 156 of the optical fiber winding 108 than would be possible were the buffer 110 not present. When the portions 154 and 156 of the optical fiber winding 108 expand at the more similar rate, the portions 154 and 156 also experience strain to a more similar degree. Because the portions 154 and 156 undergo a more similar rate of strain, a more similar amount of strain arises in the portions 154 and 156 of the optical fiber winding 108. Where the amount of strain that arises in the portions 154 and 156 is more similar, then the strain gradient between the portions 154 and 156 is decreased over what would occur were the buffer 110 not present.

The buffer layer 110 serves to promote a decrease of strain gradient among the portions of the optical fiber winding 108 along the general direction 172. For example, the buffer layer 110 promotes a decrease of the strain gradient between the portions 154 and 156 of the optical fiber winding 108. The buffer layer 112 serves to promote a decrease of the strain gradient among the portions of the optical fiber winding 108 along the general direction 170. For example, the buffer layer 112 promotes a decrease of the strain gradient between portions of the optical fiber winding 108 located in the layers 146 and 150, respectively. The buffer layers 110 and 112 in combination serve to decrease strain gradients for a plurality of portions of the optical fiber winding 108 over a plurality of directions.

The decrease in strain promoted by the buffer layer 110 in one example is represented by a promotion of a decrease of deformation of the optical fiber winding 108 close to the face 106. Compliancy of the buffer layer 110 serves to, at least in part, accommodate a tendency of the optical fiber winding 108 to expand. The buffer layer 110 itself deforms in accommodation of the expansion of the optical fiber winding 108 and/or the face 106 and thereby promote avoidance of deformation in the optical fiber winding 108.

Where the apparatus 100 comprises a fiber optic gyroscope, the optical fiber winding 108 serves to detect rotation about an axis. The sensing of rotation by the fiber optic gyroscope is influenced by where light transmitted through the optical fiber winding 108 perceives the location of the optical midpoint of the optical fiber 111. When the optical midpoint appears to move, the light perceives that the fiber optic gyroscope has rotated. The false perception of rotation causes the optical fiber winding 108 to return false information concerning rotation. To avoid false perception of movement of the optical midpoint, the buffer layer 110 accommodates expansion of the optical fiber winding 108 adjacent to the face 106. So, in one example, the optical fiber winding 108 is more symmetric than were the buffer layer 110 not present at the face 106. With increased symmetry of the optical fiber winding 108, the perceived optical midpoint of the optical fiber winding 108 remains closer to the same location during operation of the fiber optic gyroscope.

By promoting a decrease of deformation of the optical fiber winding 108, the buffer layer 110 serves to promote a decrease of thermal Shupe bias variation. In one exemplary test, employment of a buffer layer 110 having a thickness of five hundred micrometers served to decrease the thermal Shupe bias variation from 0.0250 to 0.0083 degrees rotation/degree C., a decrease by a factor of three. This decrease of the thermal Shupe bias variation serves to allow the fiber optic gyroscope to limit a position error to 0.5 meters per second. An important component of the position error is calculated by multiplying an angle error, expressed in radians, by the rotational speed of the Earth. At the equator of the Earth, for example, the rotational speed is approximately four hundred and seventy meters per second. The angle error is limited to 0.057 degrees or less to limit the component of the position error to 0.5 meters per second at the equator of the Earth.

Turning to FIGS. 3–6, plots 302, 402, 502, and 602 represent exemplary plots of strain in an optical fiber supported by a body coupled with a face. The plots 302, 402, 502, and 602 were generated using finite element analysis of an axisymmetric model of the cross section of the optical fiber winding 108. Plot 302 represents strain in an optical fiber winding for a first prior art case without a buffer layer on the body and without a buffer layer on the face. Plot 402 represents strain in the optical fiber winding 108 for a case without the buffer layer 112 on the body 104 and with the buffer layer 110 on the face 106. Plot 502 represents strain in an optical fiber winding, for a second prior art case with a buffer layer on the body and without a buffer layer on the face. Plot 602 represents strain in the optical fiber winding 108, for a case with the buffer layer 112 on the body 104 and with the buffer layer 110 on the face 106.

Plots 302, 402, 502, and 602 each include two independent variables and one dependent variable. The first independent variable is the layer number of the optical fiber winding 108 as counted outward from the body 104, for example, along the general direction 170. For example, the layer 146 is closest to the body 104 and therefore corresponds to the first layer in the plots 302, 402, 502, and 602. The second independent variable is the turn number of the optical fiber winding 108 about the body 104, for example, within the layer as counted along the general direction 172. For example, the first turn in each of the layers 146, 148, and 150 comprises the turn closest to the face 106. The dependent variable in the plots 302, 402, 502, and 602 is longitudinal glass strain per degree Celsius in the optical fiber winding 108, represented in Arbitrary Units ("AU"), as will be appreciated by those skilled in the art.

For illustrative purposes, the face 106 employed in the plots 302, 402, 502, and 602 comprises an exemplary coefficient of expansion of ten parts per million per degree Celsius. In addition, the buffer layers 110 employed in the plots 402 and 602 comprise an exemplary thickness of five hundred micrometers. The buffer layer on the body employed in the plot 502 comprises an exemplary thickness of 1.5 millimeters. The buffer layer 112 employed in the plot 602 comprises the exemplary thickness of 1.5 millimeters.

Figure 3:
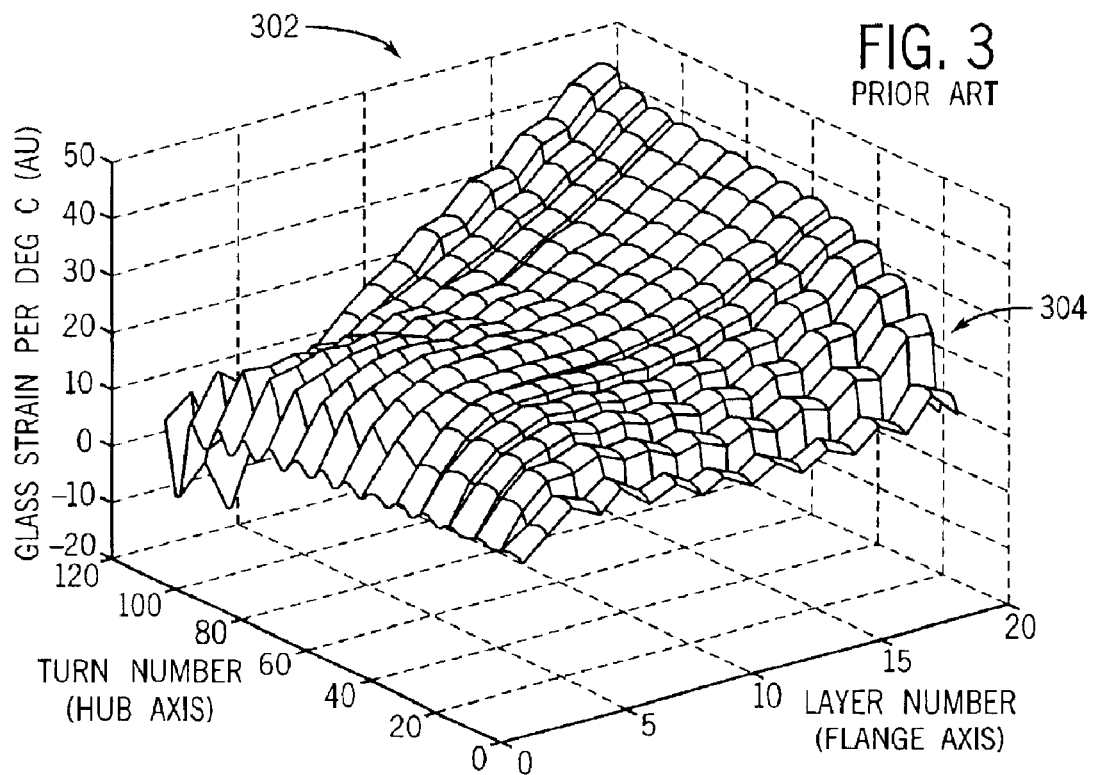
FIG. 3 is an exemplary plot of strain in an optical fiber winding about a body coupled with a face, for a first prior art case without a buffer layer on the body and without a buffer layer on the face.

Regions 304, 404, 504, and 604 of the plots 302, 402, 502, and 602 represent the first fifty turns of each layer of the optical fiber 108. Referring to FIG. 3, the region 304 represents a large gradient in strain for the prior art case where the face does not have a buffer layer and the body does not have a buffer layer. The strain of the subpart of the optical fiber winding that is adjacent to the face is effectively constrained to the coefficient of expansion of the face. A subpart of the optical fiber winding that is further from the face is not constrained and therefore reaches higher strain values. As the turn number increases from zero to fifty in the region 304, the strain in the optical fiber winding increases sharply from ten to thirty-five per degree Celsius (Arbitrary Units), for an increase of two hundred fifty percent.

Figure 4:
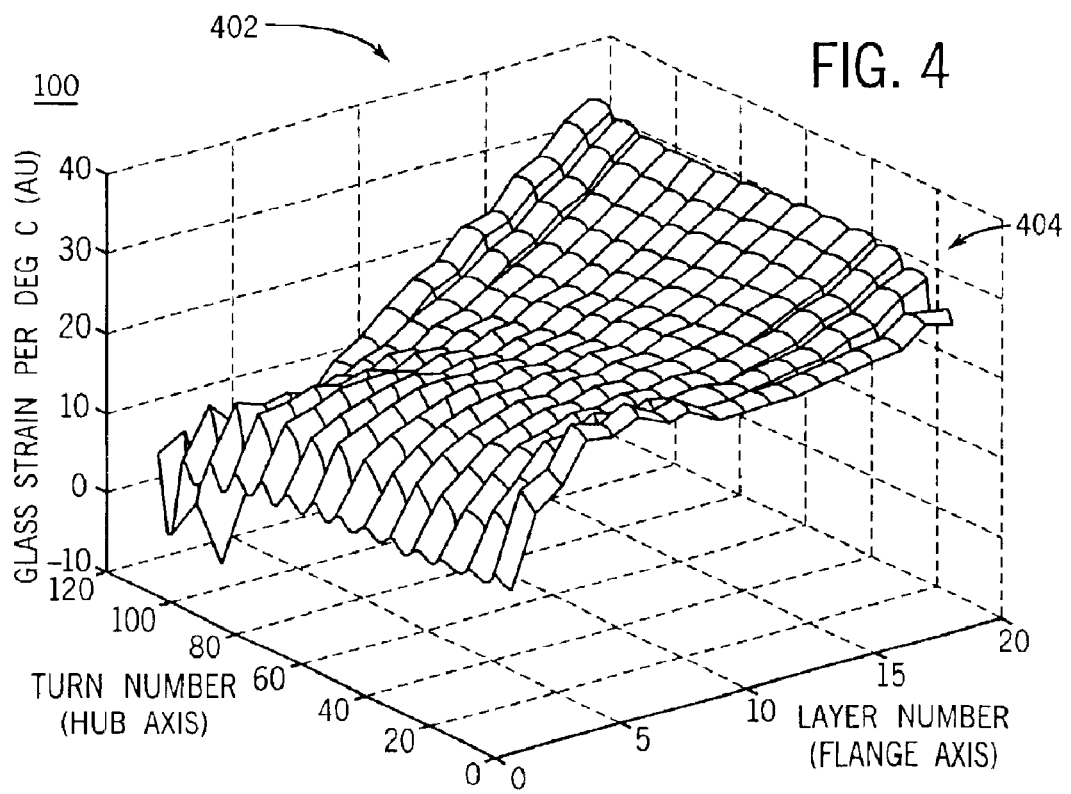
FIG. 4 is a first exemplary plot of strain in the optical fiber winding of the apparatus of FIG. 1, for a case without a buffer layer on the body and with a buffer layer on the face.

Referring to FIG. 4, the region 404 represents a greatly decreased gradient in strain for the case with the buffer layer 110 on the face 106. Specifically, the plot 402 represents the case without the buffer layer 112 on the body 104 and with the buffer layer 110 on the face 106. The buffer layer 110 serves to allow the portion of the optical fiber winding 108 that is adjacent to the face 106 to be largely free from, or relatively unconstrained by, the coefficient of expansion of the face 106. The strain of the portions of the optical fiber winding 108 closer to and further from, respectively, the face 106 varies with the layers of the optical fiber winding 108. As the turn number increases from zero to fifty in the region 404, the strain in the optical fiber winding 108 remains relatively constant in layers zero to fifteen and increases only slightly from twenty-five to thirty per degree Celsius (Arbitrary Units) in layers fifteen to eighteen, for an increase of twenty percent.

Referring to FIGS. 3–4, the difference between the plots 302 and 402 is the inclusion of the buffer layer 110 in obtaining the plot 402. Considering the outermost layer of the optical fiber winding 108, represented as layer number eighteen in the plots 302 and 402, the presence of the buffer layer 110 for the plot 402 serves to decrease the strain gradient between turn number one and turn number fifty of the regions 304 and 404 from twenty-five per degree Celsius (Arbitrary Units) in the region 304 to five per degree Celsius (Arbitrary Units) in the region 404, for a decrease of eighty percent.

Figure 5:
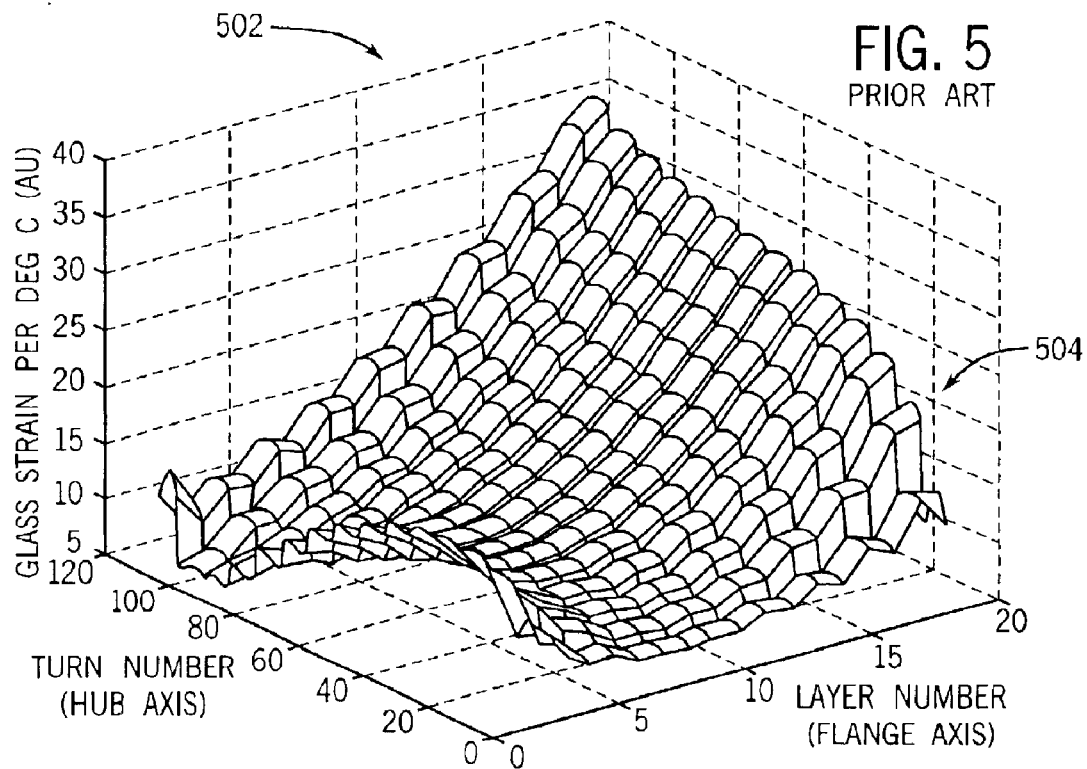
FIG. 5 is an exemplary plot of strain in an optical fiber winding about a body coupled with a face, for a second prior art case with a buffer layer on the body and without a buffer layer on the face.

Referring to FIG. 5, the region 504 represents a large gradient in strain for the second prior art case with a buffer layer on the body and without a buffer layer on the face. The strain of the subpart of the optical fiber winding that is adjacent to the face is effectively constrained to the coefficient of expansion of the face. A subpart of the optical fiber winding that is further from the face is not constrained and therefore reaches higher strain values. As the turn number increases from zero to fifty in the region 504, the strain in the optical fiber winding increases sharply from ten to twenty-five per degree Celsius (Arbitrary Units), for an increase of one hundred fifty percent.

Figure 6:
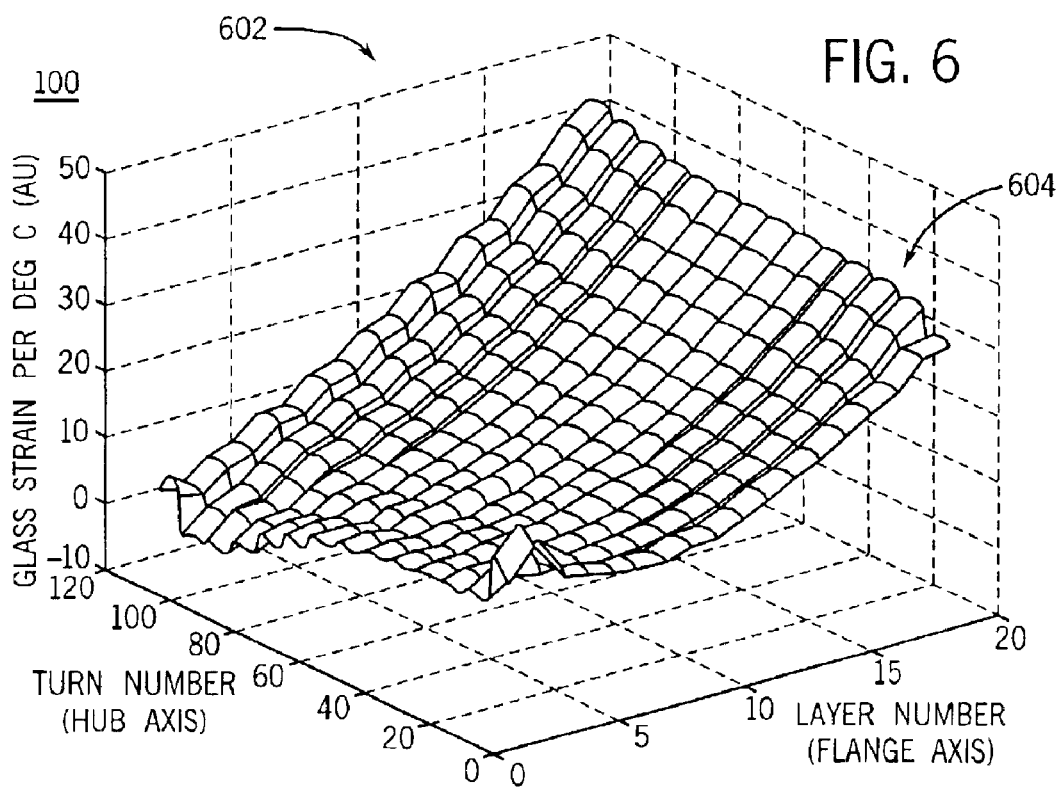
FIG. 6 is a second exemplary plot of strain in the optical fiber winding of the apparatus of FIG. 1, for a case with a buffer layer on the body and with a buffer layer on the face.

Referring to FIG. 6, the region 604 represents a greatly decreased gradient in strain for the case with the buffer layer 110 on the face 106 and the buffer layer 112 on the body 104. The buffer layers 110 and 112 cooperate to allow the fiber portion that is adjacent to the face 106 to be largely free from, or relatively unconstrained by, the coefficient of expansion of the face 106. The strain of the fiber portions closer to and further from, respectively, the face 106 varies with the layers of the optical fiber winding 108. As the turn number increases from zero to fifty in the region 604, the strain in the optical fiber winding 108 remains relatively constant in layers zero to fifteen and increases only slightly from twenty-eight to thirty-two per degree Celsius (Arbitrary Units) in layers fifteen to eighteen, for an increase of about fourteen percent.

Referring to FIGS. 5–6, the difference between the plots 502 and 602 is the inclusion of the buffer layer 10 in obtaining the plot 602. The similarity in the plots 502 and 602 is the inclusion of the buffer layer on the body in obtaining the plot 502 and the inclusion of the buffer layer 112 on the body 104 in obtaining the plot 602. Considering the outermost layer of the optical fiber winding 108, represented as layer number eighteen in the plots 502 and 602, the presence of the buffer layer 110 for the plot 602 serves to decrease the strain gradient between turn number one and turn number fifty of the regions 504 and 604 from fifteen per degree Celsius (Arbitrary Units) in the region 504 to four per degree Celsius (Arbitrary Units) in the region 604, for a decrease of about seventy-three percent.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be make without departing from the spirit of the invention and these are therefore considered to be within the scope of the invention as defined in the following claims.

What is claimed is:

1. An apparatus, comprising:
a buffer layer located on a face that serves as a primary support for an optical fiber winding along a first general direction, wherein the face is coupled with a body that serves as a primary support for the optical fiber winding along a second general direction, wherein the optical fiber winding comprises an optical fiber wound about the body;
wherein the buffer layer is located between the face and the optical fiber winding, wherein the buffer layer serve to promote a decrease of one or more strain gradients among a plurality of portions of the optical fiber winding.

2. The apparatus of claim 1, wherein the one or more strain gradients result at least in part from a difference in expansion coefficients of the optical fiber and the face;
wherein the buffer layer serves to promote the decrease of the one or more strain gradients through accommodation of the different expansion coefficients of the optical fiber and the face.

3. The apparatus of claim 2, wherein the different expansion coefficients of the optical fiber and the face promote a difference in amounts of expansion of a portion, of the plurality of portions of the optical fiber winding, and a portion of the face;
wherein the buffer layer serves to accommodate the difference in the amounts of expansion of the respective portions of the optical fiber winding and the face.

4. To apparatus of claim 3, wherein, upon expansion of one or more of the portion of the optical fiber winding and the portion of the face, the buffer layer serves to absorb at least some of the difference in the amounts of the expansion of the respective portions of the optical fiber winding and the face.

5. The apparatus of claim 3, wherein the portion of the optical fiber winding comprises a first portion of the optical fiber winding, wherein the one or more strain gradients comprise a strain gradient between the first portion and a second portion of the plurality of portions of the optical fiber winding;
wherein the buffer layer serves to promote a decrease of the strain gradient between the first and second portions of the optical fiber winding through absorption of at least some of the difference in the amounts of expansion of the first portion of the optical fiber winding and the portion of the face.

6. apparatus of claim 1, wherein the plurality of portions of the optical fiber winding comprise first and second portions located at an approximate distance outward from the body;
wherein the first portion of the optical fiber winding is located relatively closer to the face than is the second portion of the optical fiber winding;
wherein a first amount of strain arises in the first portion of the optical fiber winding and a second amount strain arises in the second portion of the optical fiber winding;
wherein the buffer layer serves to promote a decrease of a difference between the first amount of strain and the second amount of strain.

7. The apparatus of claim 1, wherein a subset of the plurality of portions of the optical fiber winding are located at an approximate distance outward from the body, wherein the buffer layer serves to promote uniformity of strain in the subset of the plurality of portions of the optical fiber winding.

8. The apparatus of claim 1, wherein the buffer layer serves to absorb at least some shear stress between the optical fiber and the face.

9. The apparatus of claim 1, wherein the buffer layer and interstitial material of the optical fiber winding comprise a substantially same material.

10. The apparatus of claim 1, wherein the buffer layer serves to promote a decrease of one or more Shupe bias variations among the plurality of portions of the optical fiber winding.

11. the apparatus of claim 1, wherein the buffer layer serves to promote a decrease deformation of the optical fiber winding.

12. The apparatus of claim 1, wherein expansion of the optical fiber winding and/or the face promotes development of a shear force in the optical fiber winding;

wherein the buffer layer serves to promote a decrease of the development of the shear force in the optical fiber winding.

13. The apparatus of claim 1, wherein the buffer layer comprises a thickness of 100 to 600 micrometers.

14. The apparatus of claim 1, wherein the buffer layer comprises a Young's modulus of $7 \times 10^6$ Newtons per square meter.

15. The apparatus of claim 1, wherein the buffer layer comprises a Poisson's ratio of 0.4970 to 0.4980.

16. The apparatus of claim 1, wherein the buffer layer comprises a first buffer layer, the apparatus further comprising:
   a second buffer layer located on the body;
   wherein the first buffer layer and the second buffer layer serve to promote the decrease of the one or more strain gradients among the plurality of portions of the optical fiber winding.

17. The apparatus of claim 1 in combination with the face, wherein the first and second general directions comprise substantially orthogonal directions.

18. The apparatus of claim 17 in combination with the body, wherein the first general direction is substantially in parallel with an axis of the body, wherein the second general direction is substantially along a radius of the body.

19. The apparatus of claim 1 in combination with the face, wherein the body comprises a spool with a flange that comprises the face.

20. The apparatus of claim 19, wherein the buffer layer comprises a coating on the face.

21. The apparatus of claim 1, wherein the optical fiber comprises a fiber optic sensing coil employable in a gyroscope.

22. The apparatus of claim 21 in combination with the gyroscope, wherein the buffer layer serves to limit a position error of the gyroscope to 0.5 meters per second or less.

23. A method, comprising the step of:
   promoting a decrease of one or more strain gradients in an optical fiber winding through employment of a buffer layer between a face and the optical fiber winding, wherein the face serves as a primary support for the optical fiber winding along a first general direction, wherein the face is coupled with a body that serves as a primary support for the optical fiber winding along a second general direction, wherein the optical fiber winding comprises an optical fiber wound about the body.

24. The apparatus of claim 1, wherein the optical fiber winding comprises the optical fiber and interstitial material.

25. The apparatus of claim 24, wherein the interstitial material in the optical fiber winding holds the optical fiber together.

26. The apparatus of claim 24, wherein an outer surface of the optical fiber winding abuts the buffer layer.

27. The apparatus of claim 24, wherein the buffer layer is separate from the interstitial material, wherein the buffer layer is located between the face and the interstitial material.

28. The apparatus of claim 1, wherein the body comprises a hub of a spool, wherein the face comprises an inward face of a flange of the spool, wherein the flange is located at an end of the hub.

29. The method of claim 23, wherein the step of promoting the decrease of the one or more strain gradients in the optical fiber winding through employment of the buffer layer between the face and the optical fiber winding comprises the steps of:
   applying the bufffer layer to the face; and
   coating the optical fiber with interstitial material, as the optical fiber is wound about the body, to create the optical fiber winding and hold the optical fiber together in the optical fiber winding;
   wherein an outer surface of the optical fiber winding abuts the buffer layer.

30. An apparatus, comprising:
   a buffer layer located between a face and an optical fiber winding, wherein the optical fiber winding comprises optical fiber and interstitial material;
   wherein the face serves as a primary support for an optical fiber winding along a first general direction, wherein the face is coupled with a body that serves as a primary support for the optical fiber winding along a second general direction.

31. The apparatus of claim 30, wherein the body comprises a hub of a spool, wherein the face comprises an inward face of a flange of the spool, wherein the flange is located at an end of the hub;
   wherein the buffer layer is coupled with the inward face of the flange;
   wherein an outer surface of the optical fiber winding abuts the buffer layer.

* * * * *